US009329356B2

(12) United States Patent
Chao et al.

(10) Patent No.: US 9,329,356 B2
(45) Date of Patent: May 3, 2016

(54) STRUCTURE FOR VOICE COIL MOTOR PROVIDING CONTROLLABLE LENS TILT CAPABILITY

(71) Applicant: AP PHOTONICS (SHEN ZHEN) LIMITED, Shenzheng (CN)

(72) Inventors: Chen Chao, Shenzhen (CN); Bin Wang, Shenzhen (CN)

(73) Assignee: AP PHOTONICS (SHEN ZHEN) LIMITED, Shenzhen (CN)

( * ) Notice: Subject to any disclaimer, the term of this patent is extended or adjusted under 35 U.S.C. 154(b) by 0 days.

(21) Appl. No.: 14/627,079

(22) Filed: Feb. 20, 2015

(65) Prior Publication Data

US 2015/0160426 A1    Jun. 11, 2015

Related U.S. Application Data

(63) Continuation of application No. PCT/CN2013/081595, filed on Aug. 16, 2013.

(30) Foreign Application Priority Data

Aug. 20, 2012  (CN) .......................... 2012 1 0296250

(51) Int. Cl.
| | | |
|---|---|---|
| *G11B 7/00* | (2006.01) | |
| *G11B 7/095* | (2006.01) | |
| *G02B 7/02* | (2006.01) | |
| *H02K 41/035* | (2006.01) | |
| *G02B 7/08* | (2006.01) | |
| *G03B 3/10* | (2006.01) | |
| *G02B 7/04* | (2006.01) | |
| *G03B 5/00* | (2006.01) | |
| *G02B 27/64* | (2006.01) | |
| *G11B 7/09* | (2006.01) | |

(52) U.S. Cl.
CPC ................ *G02B 7/023* (2013.01); *G02B 7/026* (2013.01); *G02B 7/04* (2013.01); *G02B 7/08* (2013.01); *G02B 27/646* (2013.01); *G03B 3/10* (2013.01); *G03B 5/00* (2013.01); *H02K 41/0356* (2013.01); *G11B 7/0932* (2013.01); *G11B 7/0933* (2013.01); *G11B 7/0935* (2013.01); *G11B 7/0956* (2013.01)

(58) Field of Classification Search
CPC .. G11B 7/0933; G11B 7/0935; G11B 7/0956; G11B 7/0932; G11B 2007/0006; G11B 7/093; G02B 7/023; G02B 7/026; G02B 7/04; G02B 7/08; G02B 27/646; G02B 26/085; G02B 6/3512; G02B 6/3556; G02B 6/3572; G02B 6/359; G02B 6/4225; G02B 6/4226; G02B 6/4227; G03B 3/10; G03B 5/00; G03B 17/04; H01F 7/066; H02K 41/0356; H04N 5/23287; H04N 5/2254; H04N 5/2257; H04N 5/23212; H04N 5/23248
USPC ........... 359/824, 709, 364, 719, 727; 720/683
See application file for complete search history.

(56) References Cited

U.S. PATENT DOCUMENTS

| | | | | |
|---|---|---|---|---|
| 2003/0012090 | A1* | 1/2003 | Kawano ............... | G11B 7/0933 369/44.16 |
| 2004/0130978 | A1* | 7/2004 | Hatazawa ............ | G11B 7/0933 369/44.22 |

FOREIGN PATENT DOCUMENTS

| | | |
|---|---|---|
| CN | 102347679 | 2/2012 |
| CN | 102778738 | 11/2012 |
| CN | 102798959 | 11/2012 |
| CN | 202904103 | 4/2013 |
| JP | 2011-096365 | 5/2011 |
| JP | 2011-123990 | 6/2011 |

OTHER PUBLICATIONS

International Search Report for application No. PCT/CN2013/081595, dated Nov. 28, 2013 (6 pages).

* cited by examiner

*Primary Examiner* — Dionne H Pendleton
(74) *Attorney, Agent, or Firm* — Hamre, Schumann, Mueller & Larson, P.C.

(57) ABSTRACT

A structure for a voice coil motor providing controllable lens tilt capability. The voice coil motor structure comprises a lens mount for fixedly mounting a lens (12), a focusing coil (6), a tilting coil (5, 7) and magnets (8-11), wherein the focusing coil (6) and the tilting coil (5, 7) are respectively and fixedly sleeved on the outer side of the lens mount (12). The magnets (8-11) are distributed around the focusing coil (6) and the tilting coil (5, 7) to allow the focusing coil (6) to interact with the magnets (8-11), so that the focusing coil (6) drives the lens mount (12) to move front and back to realize lens focusing. The tilting coil (5, 7) is interacted with the magnets (8-11) to allow the tilting coil (5, 7) to drive the lens mount (12) to tilt and realize lens shift. By virtue of the structure, the focusing and controllable tilting angle of the lens can be realized at the same time. The three-coil structure enables the camera to keep small size and easy to be produced at large scale; impedances of coils are easy to be matched with conventional motor driving circuits; the structure can be widely applied to the current smart cell phones to provide a shooting function same to the medium-end or high-end digital camera.

9 Claims, 3 Drawing Sheets

STRUCTURE FOR VOICE COIL MOTOR PROVIDING CONTROLLABLE LENS TILT CAPABILITY

FIELD OF THE INVENTION

The present invention discloses a voice coil motor controlling lens tilt, and more particularly discloses a voice coil motor structure providing controllable lens tilt capability.

BACKGROUND OF THE INVENTION

With continuous improvement of mobile phone production technology particularly after the appearance of smart mobile phones, there are dramatically more functions in mobile phones, and video and camera functions of mobile phones have almost become essential functions of every mobile phone. With the increasing popularization of high pixel cameras (e.g., 5M, 8M, and 12M cameras) in smart mobile phones, the photographic quality of mobile phones is getting more close to that of consumer digital cameras. However, a high pixel mobile phone camera in the prior art generally does not include some optical and mechanical components of a digital camera. Such an absence of hardware will obviously make the photographic effect of a camera mobile phone be much worse than that of a digital camera. A current camera mobile phone usually includes at most one autofocus motor for realizing the function of changing to different focuses, and the control applied to a lens by the autofocus motor is at most to make the lens to approach or leave an image sensor in a single dimension. In an advanced digital camera, a lens is simultaneously controlled to move in multiple dimensions relative to an image sensor by more complicated mechanical devices, for example, the lens is moved horizontally to realize optical image stabilization (OIS), or the lens is tilted moderately to realize lens tilt photography.

In order to make that the photographic effect of camera mobile phones further approach that of digital cameras, many international famous mobile phone autofocus motor manufacturers have started to develop three-axis autofocus motors, for example, TDK, Mistumi, and Foxconn have already manufactured optical image stabilization autofocus motors based on horizontal movements of lenses. However, these motors have very complicated structures, large sizes, and high power consumption, and therefore they have never been popularized in the market of smart mobile phones.

To this end, AP PHOTONICS LIMITED has also developed an autofocus motor capable of controlling lens movement in 3-dimension, which consists of lens tilt in 2-dimension and a linear motion along the optical axis and realizes optical image stabilization and autofocus functions. This makes a breakthrough in miniaturization of components. The size of a three-axis motor is manufactured to be as small as that of a conventional single-axis motor for the first time, the power consumption is controlled effectively, and thus the use of three-axis motors in mobile phones is really feasible. This motor design provided by AP PHOTONICS LIMITED uses several (three or more) identical actuators distributed around an lens to drive the lens to move independently in a direction that is substantially parallel to an optical axis, and realizes focusing and a controllable tilt angle of the lens by controlling the movement amount of each actuator; when the lens is tilted, an equivalent horizontal movement of the lens is simultaneously generated, so that an optical image stabilization photographic effect can be realized by associating this design with a gyroscope sensing control. However, this motor has some defects that cause difficulty in mass production and it is difficult to be matched with motor driving circuits, therefore, it is not widely popularized in smart mobile phones, either.

A current autofocus motor provided by AP PHOTONICS LIMITED usually adopts four identical actuators to jointly drive a lens to move, wherein each of the actuators makes a contribution to focusing and tilting of the lens, and therefore the four actuators need to coordinate and cooperate so that the posture of the lens can be accurately controlled. When the lens moves, three controlling parameters, which are the motor focusing position, the X-tilting angle, and the Y-tilting angle, need to be converted into four current parameters for driving the four actuators, so that the required control can be realized. Accordingly, complicated conversion algorithm needs to be embedded into a control chip of the motor. In this autofocus motor, the impedance of a coil of each actuator is relatively small (less than 10Ω), and is inconvenient to match with a conventional driving circuit; and the four actuators, which are independent of each other, need to be controlled by four identical driving circuits. Each of the driving circuits undertakes a task of controlling the focusing position and the tilting angle of the motor, and the driving current thereof is the superposition of the current controlling focusing and the current controlling tilting. Due to the restriction to the current output dynamic range of each driving circuit, the change of the focusing current will affect the dynamic range of the tilting current, and therefore the focusing movement and the tilting movement are prone to interfere with each other.

SUMMARY OF TEE INVENTION

Aiming at the above-described drawback that motors for cameras in smart mobile phones in the prior art include only simple functions or are complicated in structure and difficult to be mass-produced, the present invention provides a new voice coil motor structure providing controllable lens tilt capability, which includes a plurality of coils that are perpendicular to an optical axis and parallel to each other; wherein, one of the coils independently controls the lens to move in a direction that is perpendicular to an image sensor, and thereby realizes focusing of the lens; and other coils independently control respective controllable tilts of the lens relative to two rotation axes that are perpendicular to the optical axis and mutually orthogonal.

The present invention solves the above technical problems by adopting the following technical solution: a voice coil motor structure providing controllable lens tilt capability, wherein the voice coil motor structure comprises a lens mount for fixedly mounting a lens, a focusing coil, tilting coils, and magnets, the focusing coil and the tilting coils are respectively and fixedly sleeved on the outer side of the lens mount, the magnets are distributed around the focusing coil and the tilting coils, so that the focusing coil is interacted with the magnets to enable the focusing coil to drive the lens mount to move forward and backward and realize lens focusing, and the tilting coils are interacted with the magnets to enable the tilting coils to drive the lens mount to tilt and realize lens shift.

The technical solution adopted by the present invention to solve the above technical problem further includes the following contents:

The number of the focusing coil is one, and the number of the tilting coils is two; the tilting coils include a first tilting coil and a second tilting coil, the two tilting coils are respectively arranged at two sides of the focusing coil, the focusing coil and the tilting coils are parallel to each other, and the focusing coil and the tilting coils are respectively arranged to be perpendicular to an optical axis of the lens in the lens mount.

The number of the magnets is four, wherein a first magnet and a second magnet form a first magnet group, the first magnet and the second magnet are arranged oppositely, and the magnetic field generated by the first magnet group is mainly applied to the first tilting coil and the focusing coil; a third magnet and a fourth magnet form a second magnet group, the third magnet and the fourth magnet are arranged oppositely, and the magnetic field generated by the second magnet group is mainly applied to the second tilting coil and the focusing coil.

The magnetic polarity of an inner side of a part of the second magnet corresponding to the focusing coil is identical to the magnetic polarity of an inner side of the first magnet, and the magnetic polarity of an inner side of a part of the second magnet corresponding to the first tilting coil is opposite to the magnetic polarity of the inner side of the first magnet; the magnetic polarity of an inner side of a part of the fourth magnet corresponding to the focusing coil is identical to the magnetic polarity of an inner side of the third magnet, and the magnetic polarity of an inner side of a part of the fourth magnet corresponding to the second tilting coil is opposite to the magnetic polarity of the inner side of the third magnet.

The outer side of the lens mount is provided with a metallic magnetic yoke configured to shield internal and external magnetic fields, and the magnets are fixedly mounted in the metallic magnetic yoke.

An upper end of the lens mount is provided with a top leaf spring, a lower end of the lens mount is provided with a bottom leaf spring, and the lens mount is hung in the metallic magnetic yoke by the top leaf spring and the bottom leaf spring.

The upper and lower sides of the top leaf spring are respectively provided with insulating gaskets.

The second magnet and/or the fourth magnet realize two opposite magnetic polarization directions on the same side of the same magnet by a two-stage planar magnetization process, or are respectively formed by putting two magnets having opposite magnetic polarization directions together.

The present invention has the following, advantageous effects: the present invention uses three coils that are perpendicular to the optical axis and parallel to each other to control the lens, this motor structure is totally different from that of the prior art, and can realize the focusing and the controllable tilting angle of the lens at the same time. The three-coil structure of the present invention keeps the important advantage of a small size and is easy to be mass-produced, the impedances of the coils are easy to be matched with the motor driving circuit, and the structure can be widely used in current smart mobile phones to provide a shooting function similar to that of medium-end or high-end digital cameras. In this application, the three controlling parameters, which are the motor focusing position, the X-tilting angle, and the Y-tilting angle, can be directly used to control the three actuators, any complicated conversion algorithm is not required, and the impedance of each coil is moderate (about 15Ω) and can be well matched with the driving circuit. This application only requires three driving circuits, and thus the driving system is simplified. Each driving circuit independently controls three different movements, so that focusing and tilting includes their independent dynamic ranges and do not interfere with each other.

The present invention will be further described hereafter with reference to the accompany drawings and embodiments.

Figure 1:
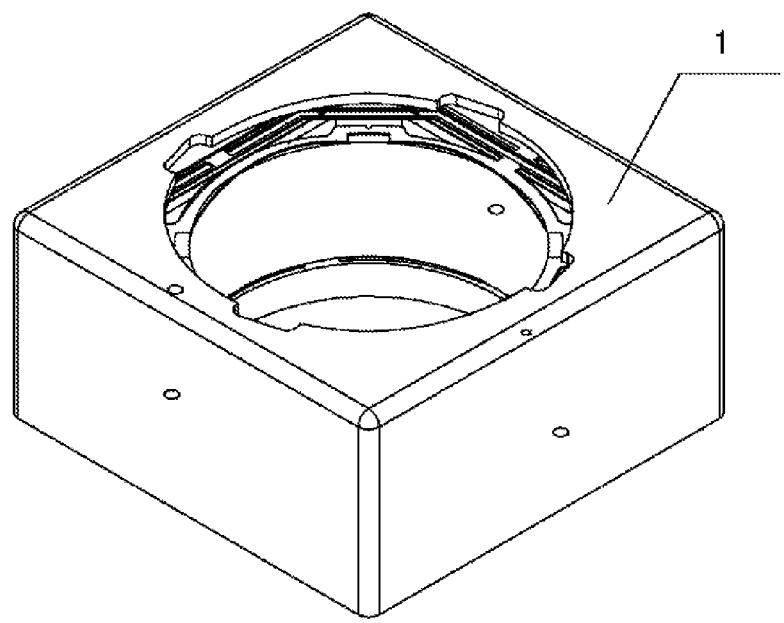
FIG. 1 is a stereo structural schematic view of an embodiment of the present invention.
Figure 2:
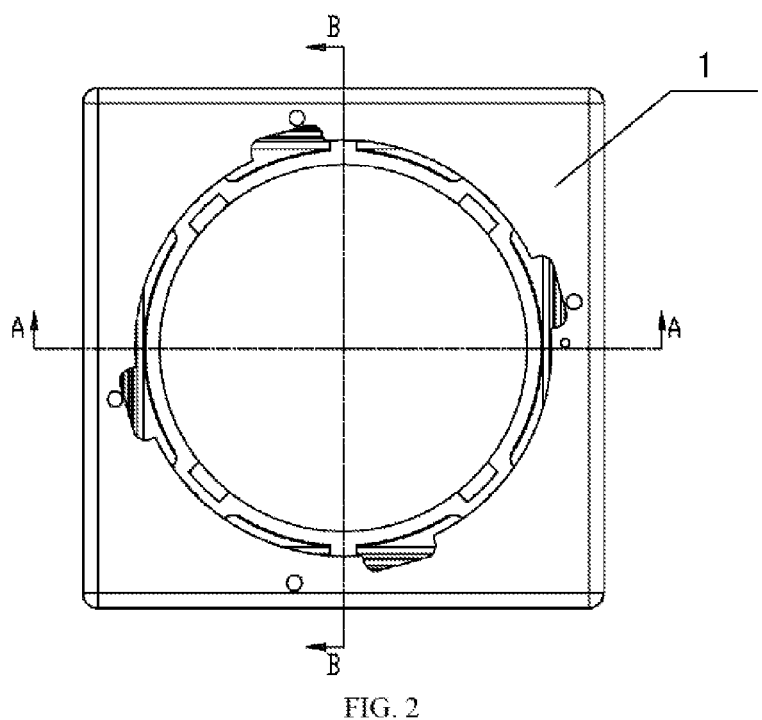
FIG. 2 is a vertical structural schematic view of an embodiment of the present invention.
Figure 3:
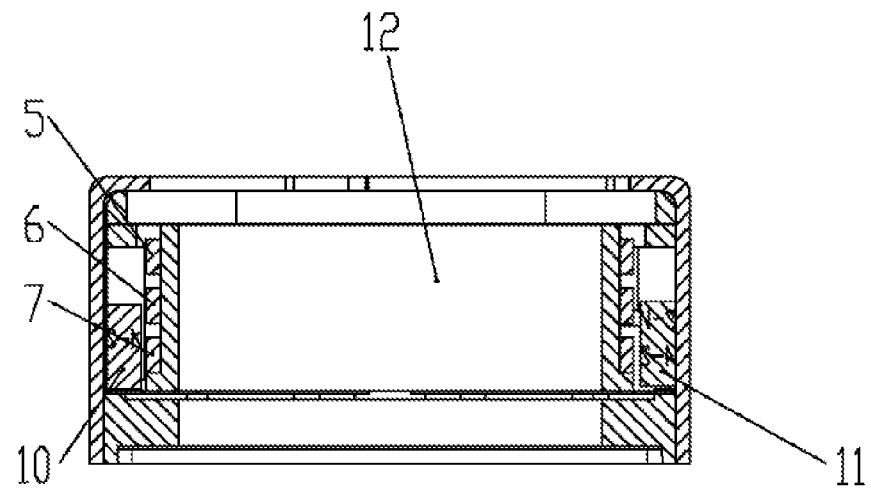
FIG. 3 is a structural schematic view of a cross section along the line A-A shown in FIG. 2.

In the drawings, the corresponding relationship between numbers and components are as follows:

1-metallic magnetic yoke; 2-first insulating gasket; 3-top leaf spring; 4-second insulating gasket; 5-first tilting coil; 6-focusing coil; 7-second tilting coil; 8-first magnet; 9-second magnet; 10-third magnet; 11-fourth magnet; 12-lens mount; 13-bottom leaf spring; 14-bottom housing.

DETAILED DESCRIPTION OF THE PREFERRED EMBODIMENT

The embodiment described hereafter is a preferred embodiment of the present invention, and any other designs including principle and basic structures identical or similar to that of this embodiment should be included in the protection scope of the present invention.

Referring to FIGS. 1-5, the core components of the present invention are three approximately rectangular coils which are parallel to each other and substantially perpendicular to an optical axis direction (the optical axis is a central axis of a light path determined by imaging lenses in a lens), and a plurality of magnet groups accurately distributed around the coils. In this embodiment, the number of the coils is three, and this structure is the simplest structure capable of achieving the purpose of the present invention; in specific implementation, the number of the coils can also be adjusted according to specific requirements. In this embodiment, one of the three coils is a focusing coil 6, the other two coils are tilting coils, which include a first tilting coil 5 and a second tilting coil 7; wherein, the focusing coil 6 is arranged in the middle, and the two tilting coils are respectively arranged at two sides.

Figure 4:
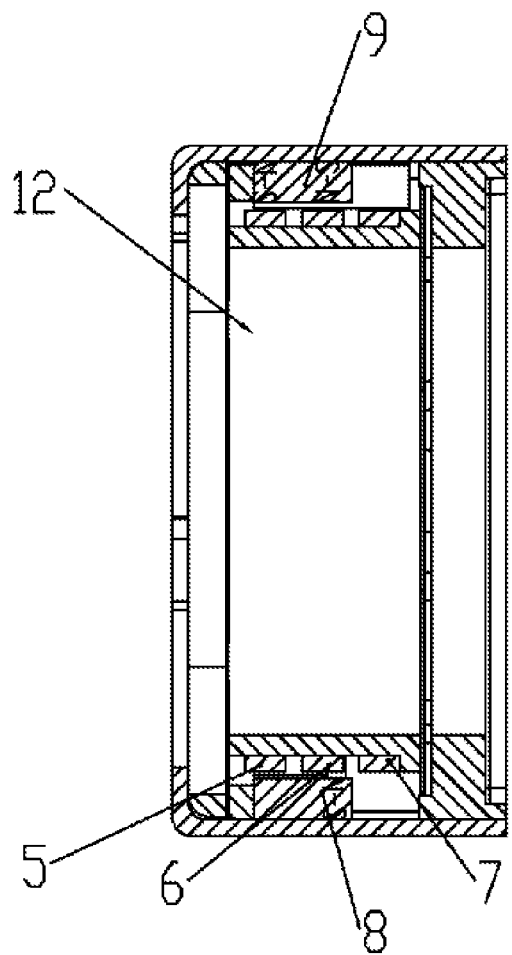
FIG. 4 is a structural schematic view of a cross section along the line B-B shown in FIG. 2.
Figure 5:
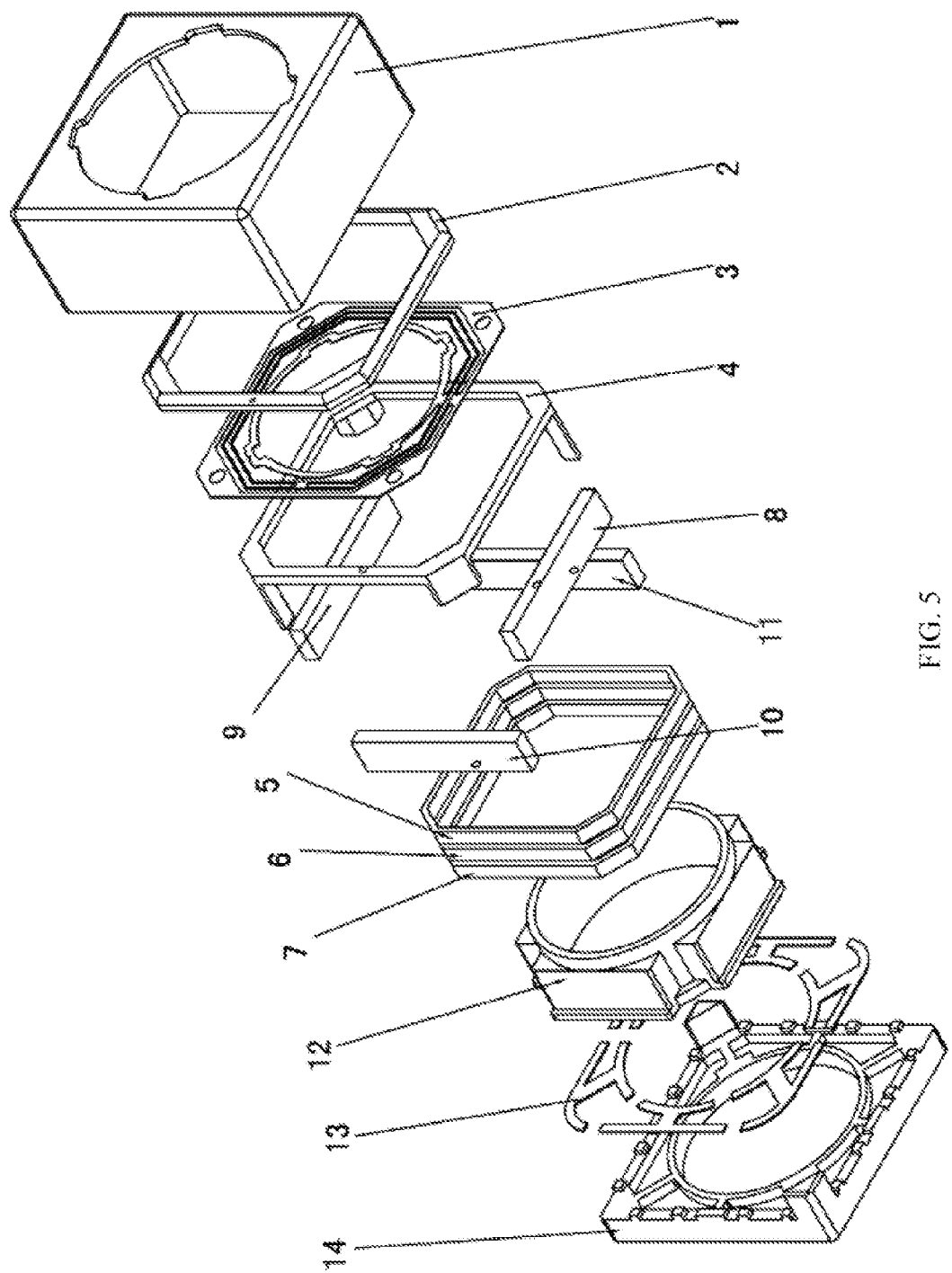
FIG. 5 is a disassembled structural schematic view of an embodiment of present invention.

Magnets are correspondingly arranged around the focusing coil 6. In this embodiment, the number of the magnets is four, and the four magnets include a first magnet 8, a second magnet 9, a third magnet 10, and a fourth magnet 11. When the focusing coil 6 is electrified, parts of the focusing oil 6 corresponding to the magnets obtain acting forces which are in the same direction and substantially parallel to the optical axis direction, and thus the focusing coil 6 drives a lens to move forward and backward and realizes a focusing function of the lens. With regard to each tilting coil, the magnets are only arranged at two opposite sides of the tilting coil, there is no magnet at the other two opposite sides of the tilting coil, and the magnetic polarities at the two sides of the tilting coil at which the magnets are arranged are opposite to each other. In this way, when the tilting coil is electrified, two parts of the tilting coil corresponding to the magnets generate two opposite forces, and thereby form a torque which drives the lens to tilt. The two tilting coils respectively and independently control the lens to tilt in two orthogonal directions. In this embodiment, the number of the magnets is four, the four magnets are divided into two magnet groups, each 1 magnet group includes two opposite magnets, and the two magnet groups are arranged orthogonally. One of the two magnet groups includes the first magnet 8 and the second magnet 9 arranged oppositely to each other and is positioned above, and the magnetic field generated by this magnet group is mainly applied to the first tilting coil 5 and the focusing coil 6; the other of the two magnet groups includes the third magnet 10 and the fourth magnet 11 arranged oppositely to each other and is positioned below, and the magnetic field generated by this magnet group is mainly applied to the second tilting coil 7 and the focusing coil 6. In this embodiment, FIG. 4 shows the magnetic pole arrangement of the first magnet 8 and the second magnet 9, wherein, the magnetic pole at an end of the first magnet 8 near an inner side of the first magnet 8 is N pole, and the magnetic pole at an end of the first magnet near an outer side of the first magnet 8 is S pole; the second magnet 9 can realize two opposite magnetic polarization directions on the same magnet by a two-stage planar magnetization process, and can also be formed by putting two magnets having opposite magnetic polarization directions together; the magnetic pole at an end of an inner side of a part of the second magnet 9 corresponding to the focusing coil 6 is N pole, and the magnet pole at an end of an outer side of the part of the second magnet 9 is S pole; the magnetic pole at an end of an inner side of a part of the second magnet 9 corresponding to the first tilting coil 5 is S pole, and the magnet pole at an end of an outer side of the part of the second magnet 9 is N pole. FIG. 4 shows the magnetic pole arrangement of the third magnet 10 and the fourth magnet 11, wherein, the magnetic pole at an end of the third magnet 10 near an inner side of the third magnet 10 is N pole, and the magnetic pole at an end of the third magnet 10 near an outer side of the third magnet 10 is S pole; the fourth magnet 11 can realize two opposite magnetic polarization directions on the same magnet by a two-stage planar magnetization process, and can also be formed by putting two magnets having opposite magnetic polarization directions together; the magnetic pole at an end of an inner side of a part of the fourth magnet 11 corresponding to the focusing coil 6 is N pole, and the magnet pole at an end of an outer side of the part of the fourth magnet 11 is S pole; the magnetic pole at an end of an inner side of a part of the fourth magnet 11 corresponding to the second tilting coil 7 is S pole, and the magnet pole at an end of an outer side of the part of the fourth magnet 11 is N pole. In specific implementation, the magnetic poles of the magnets can be all reversely arranged, and the current passing through the coils can be reversed; in this situation, the final moving directions of the motor do not change.

Besides the aforementioned core components, this embodiment further includes other peripheral components. The focusing coil 6 and the two tilting coils 5, 7 are fixedly sleeved on an outer side of a lens mount 12, the shapes of the focusing coil 6 and the two tilting coils 5, 7 fit with the outer shape of the lens mount 12, that is, the focusing coil 6 and the two tilting coils 5, 7 surround the lens mount 12. A lens (not shown) is fixedly mounted in the lens mount 12, and the lens mount 12 drives the lens to move together. A top of the lens mount 12 is fixedly provided with a top leaf spring 3, and a bottom of the lens mount 12 is fixedly provided with a bottom leaf spring 13; the lens mount 12, the focusing coil 6, and the two tilting coils 5, 7 form the movement portion of this embodiment, and the movement portion is hung by the top leaf spring 3 and the bottom leaf spring 13. In this embodiment, each of the top leaf spring 3 and the bottom leaf spring 13 is formed by one or more leaf spring layers. By adjusting the proportion of the elasticity coefficients of the leaf spring layers, the position of the rotation axis of the tilts can be accurately controlled; in combination with the control of the current of the coils, the focusing and the controllable tilts of the lens can be realized. In this embodiment, the elasticity characteristics of the top leaf spring 3 and the bottom leaf spring 13 are adjusted to certain extents, which enable the Whole hanging system to allow the movement portion to not only move back and forth for focusing but also tilt in two orthogonal directions which are perpendicular to the optical axis. The outer sides of the coils are fixedly provided with a first insulating gasket 2 and a second insulating gasket 4, and the top leafpring 3 is mounted between the first insulating gasket 2 and the second insulating gasket 4. In this embodiment, a metallic magnetic yoke 1 covers the outer side of the whole structure; the metallic magnetic yoke 1 can adsorb the magnets and thereby fix the magnets around the coils, and can also shield an internal magnetic field from an external magnetic field to prevent the internal magnetic field and the external magnetic field from interfering with each other. The first insulating gasket 2 and the second insulating gasket 4 are used to fix the top leaf spring 3 relative to the metallic magnetic yoke 1 and the magnets and electrically insulate the top leaf spring 3 from the metallic magnetic yoke 1 and the magnets. A bottom housing 14 is fixedly mounted at the bottom of the metallic magnetic yoke 1, the bottom leaf spring 13 is fixedly mounted on the bottom housing 14, the bottom housing 14 and the metallic magnetic yoke 1 are assembled together to form a containing cavity, and components of the lens mount 12 are mounted in the containing cavity.

In the use of this embodiment, when the focusing coil 6 is electrified, the polarities of opposite ones of the magnetic poles around the focusing coil 6 are identical, therefore, the focusing coil 6 can generate an acting force which substantially acts along the optical axis and has a uniform direction, and the acting force drives the lens mount 12 to move forward and backward and thereby realizes the focusing of the lens. When the first tilting coil 5 is electrified, since the first magnet 8 and the second magnet 9 corresponding thereto have opposite magnetic polarities, two opposite sides of the first tilting coil 5 generate two opposite acting forces, which form a torque and drive the lens mount 12 to tilt towards the first magnet 8 or the second magnet 9; when the second tilting coil 7 is electrified, since the third magnet 10 and the fourth magnet 11 corresponding thereto have opposite magnetic polarities, two opposite sides of the second tilting coil 7 generate two opposite acting forces, which form a torque and drive the lens mount 12 to tilt towards the third magnet 10 or the fourth magnet 11. Accordingly, by controlling the current of the three coils, the focusing movement and the tilt movements along two orthogonal axes of the lens can be respectively and independently controlled.

The present invention uses three coils that are perpendicular to the optical axis and parallel to each other to control the lens, this motor structure is totally different from that of the prior art, and can realize the focusing and the controllable tilting angle of the lens at the same time. The three-coil structure of the present invention keeps the important advantage of a small size and is easy to be mass-produced, the impedances of the coils are easy to be matched with the motor driving circuit, and the structure can be widely used in current smart mobile phones to provide a shooting function similar to that of medium-end or high-end digital cameras. In this application, the three controlling parameters, which are the motor focusing position, the X-tilting angle, and the Y-tilting angle, can be directly used to control the three actuators, complicated conversion algorithm is not required, and the impedance of each coil is moderate (about 15Ω) and can be well matched with the driving circuit. In this application, adopting only three driving circuits can finish works, and thus the circuit structure is simplified. Each driving circuit respectively and independently controls three kinds of different movements, so that focusing and tilting respectively have their independent dynamic ranges and do not interfere with each other.

What is claimed is:

1. A voice coil motor structure providing controllable lens tilt capability, comprising:
   a lens mount for fixedly mounting a lens;
   a focusing coil;
   tilting coils; and
   magnets;
   wherein, the focusing coil and the tilting coils are respectively and fixedly sleeved on the outer side of the lens mount, the magnets are distributed around the focusing coil and the tilting coils, so that the focusing coil is interacted with the magnets to enable the focusing coil to drive the lens mount to move forward and backward and realize lens focusing, and the tilting coils are interacted with the magnets to enable the tilting coils to drive the lens mount to tilt and realize lens shift,
   wherein the tilting coils include a first tilting coil and a second tilting coil and the magnets comprise a first magnet, a second magnet, a third magnet and a fourth magnet, the magnetic polarity of an inner side of a part of the second magnet corresponding to the focusing coil is identical to the magnetic polarity of an inner side of the first magnet, and the magnetic polarity of an inner side of a part of the second magnet corresponding to the first tilting coil is opposite to the magnetic polarity of the inner side of the first magnet; the magnetic polarity of an inner side of a part of the fourth magnet corresponding to the focusing coil is identical to the magnetic polarity of an inner side of the third magnet, and the magnetic polarity of an inner side of a part of the fourth magnet corresponding to the second tilting coil is opposite to the magnetic polarity of the inner side of the third magnet.

2. The voice coil motor structure providing controllable lens tilt capability according to claim 1, wherein the first tilting coil and the second tilting coil are respectively arranged at two sides of the focusing coil, the focusing coil, the first tilting coil and the second tilting coil are parallel to each other, and the focusing coil, the first tilting coil and the second tilting coil are respectively arranged to be perpendicular to an optical axis of the lens in the lens mount.

3. The voice coil motor structure providing controllable lens tilt capability according to claim 2, wherein the first magnet and the second magnet form a first magnet group, the first magnet and the second magnet are arranged oppositely, and the magnetic field generated by the first magnet group is mainly applied to the first tilting coil and the focusing coil; the third magnet and the fourth magnet form a second magnet group, the third magnet and the fourth magnet are arranged oppositely, and the magnetic field generated by the second magnet group is mainly applied to the second tilting coil and the focusing coil.

4. The voice coil motor structure providing controllable lens tilt capability according to claims 1, wherein, the outer side of the lens mount is provided with a metallic magnetic yoke configured to shield internal and external magnetic fields, and the magnets are fixedly mounted in the metallic magnetic yoke.

5. The voice coil motor structure providing controllable lens tilt capability according to claim 4, wherein, an upper end of the lens mount is provided with a top leaf spring, a lower end of the lens mount is provided with a bottom leaf spring, and the lens mount is hung in the metallic magnetic yoke by the top leaf spring and the bottom leaf spring.

6. The voice coil motor structure providing controllable lens tilt capability according to claim 4, wherein, the upper and lower sides of the top leaf spring are respectively provided with insulating gaskets.

7. The voice coil motor structure providing controllable lens tilt capability according to claim 1, wherein, the second magnet and/or the fourth magnet realize two opposite magnetic polarization directions on the same side of the same magnet by a two-stage planar magnetization process, or are respectively formed by putting two magnets having opposite magnetic polarization directions together.

8. A voice coil motor structure providing controllable lens tilt capability, comprising:
   a lens mount for fixedly mounting a lens;
   a focusing coil;
   tilting coils; and
   magnets,
   wherein, the focusing coil and the tilting coils are respectively and fixedly sleeved on the outer side of the lens mount, the magnets are distributed around the focusing coil and the tilting coils, so that the focusing coil is interacted with the magnets to enable the focusing coil to drive the lens mount to move forward and backward and realize lens focusing, and the tilting coils are interacted with the magnets to enable the tilting coils to drive the lens mount to tilt and realize lens shift,
   wherein, the number of the focusing coil is one, and the number of the tilting coils is two; the tilting coils include a first tilting coil and a second tilting coil, the two tilting coils are respectively arranged at two sides of the focusing coil, the focusing coil and the tilting coils are parallel to each other, and the focusing coil and the tilting coils are respectively arranged to be perpendicular to an optical axis of the lens in the lens mount,
   wherein, the number of the magnets is four, a first magnet and a second magnet form a first magnet group, the first magnet and the second magnet are arranged oppositely, and the magnetic field generated by the first magnet group is mainly applied to the first tilting coil and the focusing coil; a third magnet and a fourth magnet form a second magnet group, the third magnet and the fourth magnet are arranged oppositely, and the magnetic field generated by the second magnet group is mainly applied to the second tilting coil and the focusing coil, and
   wherein, the magnetic polarity of an inner side of a part of the second magnet corresponding to the focusing coil is identical to the magnetic polarity of an inner side of the first magnet, and the magnetic polarity of an inner side of a part of the second magnet corresponding to the first tilting coil is opposite to the magnetic polarity of the inner side of the first magnet; the magnetic polarity of an inner side of a part of the fourth magnet corresponding to the focusing coil is identical to the magnetic polarity of an inner side of the third magnet, and the magnetic polarity of an inner side of a part of the fourth magnet corresponding to the second tilting coil is opposite to the magnetic polarity of the inner side of the third magnet.

9. The voice coil motor structure providing controllable lens tilt capability according to claim 8, wherein, the second magnet and/or the fourth magnet realize two opposite magnetic polarization directions on the same side of the same magnet by a two-stage planar magnetization process, or are respectively formed by putting two magnets having opposite magnetic polarization directions together.

* * * * *